Patented May 27, 1924.

1,495,891

UNITED STATES PATENT OFFICE.

ROBERT E. DIVINE, OF CINCINNATI, OHIO.

PROCESS FOR MAKING FAT-SPLITTING SULPHONIC ACIDS AND PRODUCT.

No Drawing.   Application filed August 11, 1920. Serial No. 402,825.

*To all whom it may concern:*

Be it known that I, ROBERT E. DIVINE, a citizen of the United States, residing at Cincinnati, in the county of Hamilton and State of Ohio, have invented certain new and useful Improvements in Processes for Making Fat-Splitting Sulphonic Acids and Product, of which the following is a specification.

Sulphonic acids obtained from sulphonic acid sludges produced in refining petroleum hydrocarbon oils have been found to possess excellent fat splitting properties, having high efficiency in the process of hydrolyzing or decomposing fats into the corresponding fatty acid and glycerine.

Sulphonic acids heretofore produced from sulphonic acid sludges have been found to be somewhat objectionable as fat splitting agents due to the fact that both the aqueous glycerine solution and the fatty acid produced by the splitting process contain objectionable coloring matter and impurities derived from the fat splitting agent.

The object of my process is to overcome this objectionable feature by purifying the sulphonic acids to the extent at least of removing the undesirable coloring matter.

In my copending application, Serial No. 402,823 filed August 11, 1920, I have described and claimed a method of freeing sulphonic acids from water soluble coloring matter. The product produced by said process has been found to be of marked utility especially in splitting low grade fats, such as, garbage grease and the like. Since the fat splitting agents produced according to said application are free from water soluble coloring matter and impurities their use does not contaminate or discolor the glycerine solution produced in fat splitting processes. The fatty acid produced is however contaminated or discolored by impurities in the fat splitting agent. This is not particularly objectionable in the treatment of low grade fats since the fatty acids produced therefrom are contaminated with impurities from other sources and the color derived from the fat splitting agent is removed along with the other impurities present in the fatty acid by the usual process of distillation.

In the treatment of high grade fats, such as refined cotton seed oil, for the production of high grade or pure glycerine and especially pure fatty acid, it is desirable to avoid contamination of the product so far as possible and in such processes the impurities ordinarily present in fat splitting sulphonic acids heretofore produced and in the product of my said application are objectionable.

The present invention, therefore, is designed principally to remove from sulphonic acid fat-splitting agents those impurities, particularly coloring matter, which otherwise would contaminate the fatty acid product of fat splitting processes.

My process is as follows. I first form a product comprising water insoluble metallic salts of the sulphonic acids present in petroleum sulphonic sludges.

Petroleum sulphonic sludge, particularly such sludges as are produced by treating heavy hydrocarbon oils with strong or fuming sulfuric acid are first washed with water to remove excess sulfuric acid. The metal compounds of the sulphonic acids are then precipitated preferably by adding a solution of aluminum sulfate to the sludge and boiling. The resulting metal sulfonates, specifically aluminum sulfonates, are separated from the mother liquor and then repeatedly washed with boiling water until substantially free from water-soluble impurities and coloring matter. The production of metal sulfonates free from water-soluble impurities is described in detail in my copending application above referred to.

The metal sulfonates product obtained as described above, contains some free oil and other impurities and coloring matter, which are not soluble in water.

The metal sulfonates, specifically aluminum sulfonate, produced as described above, are freed from all or the greater portion of free oil by extraction with hot naphtha or other suitable solvent capable of dissolving the oil but incapable of dissolving the aluminum sulfonates. The aluminum sulfonates are separated from the naphtha solution of oil by settling and decantation or otherwise, and are freed from naphtha by blowing with steam. When naphtha has been removed to the desired extent the product is dried (freed from water) by heating and stirring, for instance, in a steam jacketed kettle. The dry product is substantially free from oil but if desired may be ground and again extracted with naphtha for the further removal of free oil.

The resulting product comprising aluminum sulfonates is substantially free from oil and coloring matter and may be employed directly for fat splitting or it may be decomposed by means of acid, for example, sulfuric acid in the usual well known manner, and the sulphonic acids separated and used for fat splitting. For some purposes, however, further purification is desirable and this is accomplished as follows.

The dry aluminum sulfonates produced as described above are dissolved in hot methyl or ethyl alcohol or acetone or any mixture thereof or other suitable organic solvent, and the resulting solution is filtered through fuller's earth, charcoal or animal char or other suitable filtering medium. Coloring matter and impurities carried by the sulfonates are taken up by the filtering medium and a clear solution of the sulfonate in the organic solvent is produced. The purified solution is evaporated and the solvent recovered. The residue is a purified metal sulfonate, specifically aluminum sulfonate, which is well adapted for use as a commercial saponifier. It may be employed directly for fat splitting purposes and besides splitting the fat with high efficiency does not discolor or contaminate either the glycerine or fatty acid product.

If desired, the purified aluminum or other metal sulfonates produced as described may be decomposed and the free sulphonic acids recovered by boiling the metal sulfonates with sulfuric acid, and recovering the sulphonic acids from the resulting mixture in the usual well known manner.

The fat splitting sulphonic acids products produced by my process are efficient for fat splitting purposes, and being substantially free from coloring matter, impurities or other foreign material constitute a highly concentrated fat splitting agent. Glycerine and fatty acids produced by splitting high grade fats by the use of my fat splitting agent are less discolored than by any sulphonic saponifier heretofore produced.

The expression "sulphonic acids products" as used in the specification and claims designates both the sulphonic acids derived from petroleum sulphonic sludge and the salts of such acids and does not include decomposition or transformed products which do not contain either the sulphonic acids or the sulphonic acid groups.

I claim:
1. Process for making a sulphonic fat splitting agent which comprises washing a water insoluble compound of petroleum sulphonic acid with water, and extracting water insoluble impurities from the washed material by means of an organic solvent.

2. Process for making fat splitting agents which comprises successively washing a water insoluble metal compound of petroleum sulphonic acid with hot water and naphtha.

3. Process for purifying sulphonic acid obtained from petroleum sulphonic sludge which comprises combining said sulphonic acid with a metal forming a water insoluble compound with said acid, washing the resulting compound with water and thereafter extracting said compound with naphtha.

4. Process for purifying sulphonic acids resulting from the treatment of petroleum hydrocarbon oils with fuming sulfuric acid which comprises boiling petroleum sulphonic sludge with a solution of aluminum sulfate, separating the resulting precipitate, repeatedly boiling said precipitate with water until said precipitate is substantially free from water soluble impurities, extracting oil from said precipitate with naphtha, dissolving said precipitate in alcohol, filtering said solution through decolorizing material, and evaporating the resulting solution.

5. Process for making a sulphonic acid fat splitting agent as described in claim 4 wherein the residue resulting from the evaporation of the filtered alcoholic solution of aluminum sulfonates is decomposed with acid whereby purified sulphonic acids are produced.

6. Process for purifying insoluble aluminum sulfonates which comprises extracting said sulfonates with naphtha, drying said sulfonates, dissolving said sulfonates in an organic solvent and treating the solution with decolorizing material.

7. Process for purifying insoluble aluminum sulfonates derived from petroleum sulphonic sludge which comprises extracting said sulfonates with naphtha, drying said sulfonates, dissolving said sulfonates in alcohol and filtering said solution through fuller's earth.

8. Sulphonic fat-splitting agent derived from petroleum sulphonic sludge, said agent comprising aluminum sulfonates insoluble in water substantially free from oil and coloring matter.

In testimony whereof, I affix my signature.

ROBERT E. DIVINE